United States Patent
Kerkar et al.

(10) Patent No.: US 6,849,118 B2
(45) Date of Patent: Feb. 1, 2005

(54) ADMIXTURE FOR MINIMIZING THE PRESENCE OF SURFACE DUST ON CEMENT AND CONCRETE STRUCTURES

(75) Inventors: Awdhoot V. Kerkar, Rockaway, NJ (US); Kati Hazrati, Arlington, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 349 days.

(21) Appl. No.: 10/221,248

(22) PCT Filed: Mar. 26, 2001

(86) PCT No.: PCT/US01/09655

§ 371 (c)(1),
(2), (4) Date: Dec. 2, 2002

(87) PCT Pub. No.: WO01/74733

PCT Pub. Date: Oct. 11, 2001

(65) Prior Publication Data

US 2003/0209170 A1 Nov. 13, 2003

Related U.S. Application Data

(60) Provisional application No. 60/193,978, filed on Mar. 31, 2000.

(51) Int. Cl.[7] ............................................. C04B 24/02
(52) U.S. Cl. ..................... 106/823; 106/696; 106/708; 106/724; 106/778; 106/795; 106/802
(58) Field of Search ............................. 106/696, 708, 106/724, 778, 795, 802, 823

(56) References Cited

U.S. PATENT DOCUMENTS

| | | | |
|---|---|---|---|
| 3,486,916 A | 12/1969 | Cordon | 106/90 |
| 3,583,880 A | 6/1971 | Moren et al. | 117/54 |
| 3,630,816 A | 12/1971 | Parker | 428/221 |
| 4,547,223 A | 10/1985 | Goto et al. | 106/90 |
| 5,181,961 A | 1/1993 | Umaki et al. | 106/724 |
| 5,326,396 A | 7/1994 | Abdelrazig et al. | 106/808 |
| 5,326,397 A | 7/1994 | Abdelrazig et al. | 106/808 |
| 5,348,993 A | 9/1994 | Daeumer et al. | 524/44 |
| 5,389,143 A | 2/1995 | Abdelrazig et al. | 106/626 |
| 5,413,634 A | 5/1995 | Shawl et al. | 106/696 |
| 5,556,460 A | 9/1996 | Berke et al. | 106/823 |
| 5,603,760 A | 2/1997 | Berke et al. | 106/802 |
| 5,618,344 A | 4/1997 | Kerkar et al. | 106/823 |
| 5,626,663 A | 5/1997 | Berke et al. | 106/696 |
| 5,938,835 A | 8/1999 | Shawl et al. | 106/724 |
| 6,054,086 A | 4/2000 | Kurihara et al. | 264/147 |
| 6,110,588 A | 8/2000 | Perez et al. | 428/359 |
| 6,162,845 A | 12/2000 | Freed | 523/122 |
| 6,197,423 B1 | 3/2001 | Rieder et al. | 428/397 |

FOREIGN PATENT DOCUMENTS

| | | | |
|---|---|---|---|
| GB | 1224206 | 3/1971 | C04B/41/00 |
| WO | 95/04008 | 2/1995 | C04B/24/02 |

*Primary Examiner*—Anthony J. Green
(74) *Attorney, Agent, or Firm*—Craig K. Leon; William L. Baker

(57) ABSTRACT

An admixture for minimizing or preventing dust on surfaces of cured cement and concrete structures comprises a shrinkage reducing additive in combination with a fatty alcohol. Cementitious compositions containing the admixture, and methods for reducing dusting on cement structures, are also described.

19 Claims, No Drawings

ADMIXTURE FOR MINIMIZING THE PRESENCE OF SURFACE DUST ON CEMENT AND CONCRETE STRUCTURES

This application claims the benefit of Ser. No. 60/193,978 filed Mar. 31, 2000.

FIELD OF THE INVENTION

The present invention relates to admixtures and methods for improving cementitious mixtures, and more particularly for minimizing or preventing dust on cement and concrete structures caused by shrinkage reduction additives.

BACKGROUND OF THE INVENTION

Hydraulic (e.g., hydratable) cementitious compositions, such as mortar (cement, small particulate, e.g., sand, and water), or concrete (cement, small particulate, large particulate, e.g., gravel, and water), are used extensively in forming, either alone as a concrete formation or in combination with other elements as a mortar and brick formation) architectural structural formations. These compositions have certain properties that substantially affect their durability, including shrinkage that occurs during drying and curing of the cement composition.

Conventional hydraulic cement compositions display a decrease in volume with setting and drying of the cast composition Although the magnitude of the volume decrease is normally small, it is of extreme importance. This shrinkage results in cracks and other defects that decrease the service life and durability of the resultant structure. The cracks provide a path for air to penetrate into the structure, promoting carbonation of the cement and corrosion of the metal reinforcing bars contained therein. Further, the cracks provide a means for water to seep into and through the structure. Such water entry further deteriorates the structure through freeze-thaw cycling pressures exerted on the cement structure over its life. It is highly desired to provide cements and cementitious mixtures that exhibit high strength and are not subject to deterioration effects due to shrinkage.

With respect to overcoming the drying shrinkage of cement compositions (such as concrete mixtures), the literature teaches that various oxyalkylene adducts are suitable for this purpose. For example, U.S. Pat. No. 3,663,251 teaches a shrinkage reducing additives of the general formula $RO(AO)_nH$, in which R may be a $C_1$–$C_7$ alkyl or $C_5$–$C_6$ cycloalkyl radical, A may be a $C_2$–$C_3$ alkylene radical, and n is 1–10. Other references concerning shrinkage reducing additives are identified in U.S. Pat. No. 5,603,760, which is incorporated herein by reference.

The present inventors have discovered surprisingly that oxyalkylene compounds which provide shrinkage inhibition in cements and concretes have a tendency to generate dust particles on the surface of the resultant cement or concrete structure. This can create an undesired problem, for example, in applications such as self-leveling concrete or foundations, against which or upon which coatings or adhesives are applied to attach tiles, wood flooring, carpeting, or other surface treatments. The problem is caused by the dust which tends to defeat the ability of the coating or adhesive to attach to the resultant structure. Accordingly, the present invention provides a novel admixture, method, and cementitious composition wherein the formation of surface dust is prevented or minimized.

SUMMARY OF THE INVENTION

The present invention is directed to a cement admixture, and to a method of forming a cementitious structure having a surface substantially free of dust, which is capable of inhibiting drying shrinkage. An exemplary admixture of the invention thus comprises at least one shrinkage reducing additive and at least one fatty alcohol. For example, the admixture may comprise (i) at least one alkyl ether oxyalkylene glycol adduct operative to inhibit shrinking during drying of cement, the glycol adduct being represented by the formula $R^1O(AO)_nH$ wherein $R^1$ represents hydrogen, a $C_1$–$C_7$ alkyl group, or $C_5$–$C_6$ cycloalkyl group; O represents oxygen, A represents one or more $C_1$–$C_4$ alkylene adducts (and preferably AO represents ethylene oxide, propylene oxide, or mixture thereof), H represents hydrogen, and "n" represents an integer of 1–10 (and more preferably 1–5); and (ii) at least one fatty alcohol represented by the formula $R^2OH$ wherein $R^2$ represents a $C_8$–$C_{22}$ linear or branched alkyl group, and more preferably a $C_{14}$–$C_{22}$ linear or branched alkyl group. Cementitious compositions comprising the admixture, and methods involving the use of the admixture to minimize surface dust on cement mixtures, are also disclosed.

DETAILED DESCRIPTION OF EXEMPLARY EMBODIMENTS

The terms "cement" and "cement composition" (which is synonymous with "cementitious compositions") may be used herein to refer to dry powders as well as to pastes, mortars, grouts such as oil well cementing grouts, and concrete compositions comprising a hydraulic cement binder. The terms "paste", "mortar" and "concrete" are terms of art: pastes are mixtures composed of a hydratable binder (usually, but not exclusively, Portland cement, masonry cement, or mortar cement and may also include gypsum, limestone, hydrated lime, fly ash, blast furnace slag, pozzolans, and silica fume or other materials commonly included in such cements) and water; mortars are pastes additionally including fine aggregate (e.g., sand), and concretes are mortars additionally including coarse aggregate (e.g., gravel, stone). The cement compositions tested in this invention may be formed by mixing required amounts of certain materials, e.g., a hydratable binder (such as cement), water, and fine and/or coarse aggregate, as may be applicable to make the particular cement composition being formed.

The term shrinkage reducing agent as used herein means and refers to admixtures which are used for inhibiting shrinkage of cementitious compositions. Preferred shrinkage reducing agents comprise an alkyl ether oxyalkylene glycol adduct represented by the formula $R^1O(AO)_nH$ wherein $R^1$ represents hydrogen, a $C_1$–$C_7$ alkyl group, or $C_5$–$C_6$ cycloalkyl group; O represents oxygen; A represents one or more $C_1$–$C_4$ alkylene adducts (and preferably ethylene oxide, propylene oxide, or mixture thereof); H represents hydrogen, and "n" represents an integer of 1–10 (and more preferably an integer of 1–5). Examples of such $R^1$ groups are methyl, ethyl, propyl, isopropyl, n-butyl, isobutyl, tertiary butyl, n-pentyl, isopentyl, cydopentyl, cyclohexyl and the like. The preferred adducts have $R^1$ groups of $C_3$–$C_5$ alkyl, such as propyl, isopropyl, n-butyl, t-butyl, isopentyl and the like. The most preferred adducts have $R^1$ groups of butyl or cyclohexyl group. The symbol A in the above formula represents at least one $C_2$–$C_4$ alkylene group such as, for example,

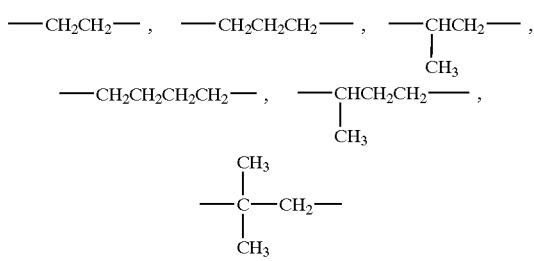

and the like mixtures thereof; O represents an oxygen atom; n represents an integer of 1–10 (and more preferably 1–5). The preferred compounds of these ether adducts are those wherein $R^1$ represents a butyl group, A represents an ethylene or propylene, and n is 2 or 3.

The most preferred adduct is dipropylene glycol mono-t-butyl ether and tripropylene glycol mono-t-butyl ether. Dipropylene glycol mono-tertiary butyl ether has the structure:

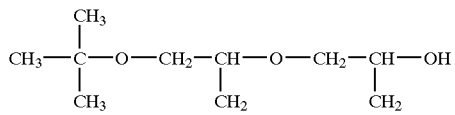

Such a composition may be used in combination, in further exemplary embodiments, with dipropylene glycol to further enhance shrinkage reduction properties. The formula of dipropylene glycol is provided below:

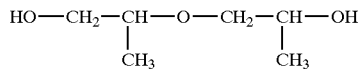

A further exemplary shrinkage reducing admixture is an alkylene glycol having the formula H-R-O-H wherein R is a $C_3$ through $C_{10}$ group, and is most preferably hexylene glycol.

Exemplary shrinkage reducing admixtures which are believed suitable for use in the invention are taught in U.S. Pat. No. 5,413,634 (Shawl et al.); U.S. Pat. No. 5,556,460 (Berke et al.); U.S. Pat. No. 5,603,760 (Berke et al.); U.S. Pat. No. 5,618,344 (Kerkar et al.); U.S. Pat. No. 5,626,663 (Berke et al.); and U.S. Pat. No. 5,938,835 (Shawl et al.), all of which are incorporated herein by reference.

Shrinkage reducing admixtures, which are believed suitable for the invention, are commercially available from Grace Construction Products under the ECLIPSE® brand name.

Exemplary fatty alcohols useful in the present invention are represented by the formula $R^2OH$ wherein $R^2$ represents a $C_8$–$C_{22}$ linear or branched alkyl group. Such fatty alcohols are generally known to those skilled in the art and are disclosed, for example, in U.S. Pat. No. 3,486,916 and in PCT World Patent Application No. WO/04008 of Abdelrazig et al., both of which are incorporated herein by reference. Preferred fatty alcohols, having from 14 to 22 carbon atoms in their hydrocarbon chains, include myristic alcohol, cetyl alcohol, stearyl alcohol (octadecanol), arachidic alcohol, all of which are solids at room temperature. Preferred fatty alcohols include octadecanol, eicosanol, and docosanol.

In exemplary admixtures of the invention, the shrinkage reducing additive (e.g., alkyl ether oxyalkylene glycol adduct) are preferably combined together with the fatty alcohol neat, since the fatty alcohols have low solubility in water, such that the formation of emulsions is difficult and unnecessary. The ratio of the shrinkage reducing additive to fatty alcohol components may be 99.99–95.0%/0.01–5.0%; and more preferably 99.5–97.0%/0.5–3.0%; and most preferably 99–98%/1–2%, all percentages based on total dry weight of the two components in the admixture. An admixture comprising the SRA and fatty alcohol may be added to a cementitious composition in the amount of 0.5–5.0% by weight of cement in the composition, and more preferably 1–3% by weight. Various conventional ingredients may also be optionally used. Among the optional employable ingredients are water reducing agents, preferably superplasticizers, and most preferably polycarboxylate type comb polymers (a suitable superplasticizer is commercially available from Grace Construction Products under the ADVA® tradename).

Other optional ingredients may include conventional hardening accelerators (such as metal chlorides such as calcium chloride and sodium chloride, metal sulfates such as sodium sulfate, and organic amines such as triethanolamine); ordinary hardening retarders (such as alcohols, sugars, starch, and cellulose); reinforcing-steel corrosion inhibitors (such as calcium nitrite and/or calcium nitrate, sodium nitrate); and conventional water reducing agents and high-range water reducers (such as lignosulfonic adds and their salts and derivatives, hydroxylated carboxylic adds and their salts; condensation products of naphthalene-sulfonic acids and formaline, sulfonated melamine polycondensation products, amines and their derivatives, alkanolamines, and inorganic salts such as borates, phosphates, chlorides and nitrates; super plasticizers; and the like). The quantity of such an optional ingredient or ingredients is usually 0.05–6.0% or more by weight of the cement.

Preferably, at least one compound or composition capable of imparting air entrainment to the resultant cement (or concrete) structure is employed. Optionally, this may be premixed as part of shrinkage reducing additive/fatty alcohol admixture product, or separately introduced into the cement or concrete mixture to be treated. Such air entraining agents are well known, and include, for example, tall oil fatty acids and their esters, gum resins and rosins, sulfite liquors and the like. The air entraining agent can be used in amounts sufficient to impart from about 4 to 10 volume percent air voids (or more) in the resultant cement structure. The exact dosage needed for a particular agent to attain a particular degree of air can be readily determined.

Exemplary cementitious compositions of the invention comprise a hydratable binder (such as Portland cement, gypsum, or any of the other binders previously mentioned above) in combination with the above-described fatty alcohol, a shrinkage reduction admixture, and optionally the conventional ingredients previously identified above.

Particularly preferred cementitious compositions of the invention are mortars which are used in self-leveling concrete production and processes. Self-leveling concrete is made from combining water with a particular dry mortar mix involving dry cement with "fines" (e.g., limestone dust in amounts of 15–25% by weight) and optional colorants. The dry mortar and water are mixed and placed into a shallow mold (form) to form a floor slab. It is particularly appreciated in these applications to avoid drying shrinkage and the formation of dust on the surface of the resultant hardened slab.

The features and advantages of the present invention may be more fully appreciated in view of the following examples.

EXAMPLE 1

Mixes of self-leveling floor screeds (shallow slabs) were made using the following base materials: 17% cement, 20% limestone dust, 63% (aggregate (0–6 mm sand), and water (all percentages based on total dry weight of mix materials). Small slabs having dimensions of approximately 5"×10"× 1.5"× were cast and left uncovered at room temperature to cure. The top surface of each slab was analyzed qualitatively for dusting after 2, 4, and 8 days after curing, using a small plastic brush and applying eight strokes at the same location The dusting level was rated from "0" (indicating no dry dust) to "5" (high amount of dust). The results of mixes containing different admixtures are provided in Table 1 below. Mix 1 contained only a superplasticizer (a polycarboxylate type sold by Grace Construction Products under the ADVA® name), and in Mix 2 a shrinkage reducing additive (an alkyl ether oxyalkylene glycol type of SRA sold by Grace under the ECUPSE® name). Only the sample with the SRA showed a significant amount of dust on the surface of the sample (and this was rated as a "5"). Mix 3 contained a melanine sulfonate base superplasticizer in combination with the SRA and mix 4 contained a naphtalene based superplastizer in combination with the SRA. The resultant mixes in 3 and 4 showed both a high level of dust on the surface of the samples. In Mix 5, a superplasticizer and a modified SRA were used. The SRA was modified by incorporating approximately 1% by weight of a fatty alcohol (octadecanol in this case). In Mix 6, just the SRA and fatty alcohol were combined. The resultant mixes in 5 and 6 were stable (no segregation), and neither of the resultant hardened samples formed from the mixes showed dusting.

TABLE 1

| Mix | Sample | Water reducer/ Superplasticizer | SRA | Dust after 2 days | Dust after 4 days | Dust after 8 days |
|---|---|---|---|---|---|---|
| 1 | Superplasticizer (ADVA ® brand) | 13.40 oz/cwt | — | (0) | (0) | (0) |
| 2 | Superplasticizer (ADVA ® brand) SRA (ECLIPSE ® brand) | 13.40 oz/cwt | 33.4 oz/cwt | (5) | (5) | (5) |
| 3 | Water reducer (Melamine Sulfonate) SRA (ECLIPSE ® brand) | 25.00 oz/cwt | 33.4 oz/cwt | N/A | (5) | (5) |
| 4 | Water reducer (Naphthalene) SRA (ECLIPSE ® brand) | 26.15 oz/cwt | 33.4 oz/cwt | N/A | (5) | (5) |
| 5 | Superplasticizer (ADVA ® brand) SRA (ECLIPSE ®) Fatty Alcohol (Octadecanol (1%)) | 13.40 oz/cwt | 33.4 oz/cwt | (0) | (0) | (0) |
| 6 | SRA (ECLIPSE ® brand) Fatty Alcohol (Octadecanol (1%)) | — | 33.4 oz/cwt | (0) | (0) | (0) |

EXAMPLE 2

A further set of samples were run using varying amounts of ocstadecanol, beginning with 0.5% (by weight), and using 1.0%, 2.0%, and 3.0% amounts respectively, as shown in Table 2 below (See Mixes 9–12).

TABLE 2

| Mix | Sample | Water reducer/ Superplasticizer | SRA | Dust after 2 days | Dust after 4 days | Dust after 8 days |
|---|---|---|---|---|---|---|
| 7 | Superplasticizer (ADVA ® brand) No Fatty Alcohol | 13.40 oz/cwt | — | (0) | (0) | (0) |
| 8 | Superplasticizer (ADVA ® brand) SRA (ECLIPSE ® brand) No Fatty Alcohol | 13.40 oz/cwt | 33.4 oz/cwt | (5) | (5) | (5) |
| 9 | Superplasticizer (ADVA ® brand) SRA (ECLIPSE ® brand) Fatty Alcohol (Octadecanol (0.5%)) | 13.40 oz/cwt | 33.4 oz/cwt | (1) | (1) | (1) |
| 10 | Superplasticizer (ADVA ® brand) SRA (ECLIPSE ® brand) Fatty Alcohol (Octadecanol (1.0%)) | 13.40 oz/cwt | 33.4 oz/cwt | (0) | (0) | (0) |
| 11 | Superplasticizer (ADVA ® brand) SRA (ECLIPSE ® brand) Fatty Alcohol (Octadecanol (2.0%)) | 13.40 oz/cwt | 33.4 oz/cwt | (0) | (0) | (0) |
| 12 | Superplasticizer (ADVA ® brand) SRA (ECLIPSE ® brand) Fatty Alcohol (Octadecanol (3.0%)) | 13.40 oz/cwt | 33.4 oz/cwt | (0) | (0) | (0) |

The results are unexpected and novel because the addition of a small amount of a $C_8$–$C_{22}$ alkyl alcohol, such as octadecanol (stearyl alcohol), results in preventing dusting in cement samples wherein a shrinkage reducing additive (SRA) is employed, without undermining the ability of the SRA to inhibit drying shrinkage of the sample.

It is believed that the use of the $C_8$–$C_{22}$ alkyl alcohols help to minimize dusting caused by SRA's in cementitious compositions. Those skilled in the art may, in view of the teachings herein, vary the size of the chain of the fatty alcohols and/or vary the dosage amount of the fatty alcohols, to control dusting levels.

The foregoing examples are provided for illustration only and are not intended to limit the scope of the invention.

What is claimed is:

1. An admixture, comprising: (i) at least one shrinkage reducing additive present in the amount no less than 95.0% and in an amount no greater than 99.99%, based on dry weight total solids, said at least one shrinkage reducing additive comprising an alkyl ether oxyalkylene glycol adduct represented by the formula $R^1O(AO)_nH$ wherein $R^1$ represents hydrogen, a $C_1$–$C_7$ alkyl group, or a $C_5$–$C_6$ cycloakyl group; O represents oxygen, A represents one or more $C_1$–$C_4$ alkylene adducts, H represents hydrogen, and "n" represents an integer of 1–10; and (ii) at least one fatty alcohol present in an amount no less than 0.1% and in an amount no greater than 5.0%, based on dry weight total solids, said fatty alcohol being represented by the formula $R^2OH$ wherein $R^2$ represents a $C_8$–$C_{22}$ linear or branched alkyl group.

2. The admixture claim 1 wherein $R^1$ and $R^2$ represent linear or branched alkyl groups.

3. The admixture of claim 2 wherein said $R^2$ represents a $C_{14}$–$C_{22}$ linear or branched alkyl group.

4. The admixture of claim 3 wherein said shrinkage reducing additive comprises dipropylene glycol:

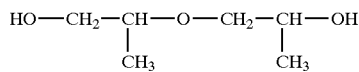

as represented by the structure above.

5. The admixture of claim 4 further comprising dipropylene glycol-tertiary-butyl ether:

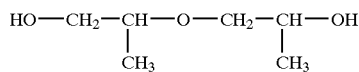

as represented by the structure above.

6. The admixture of claim 4 wherein said fatty alcohol is selected from the group consisting of octadecanol, eicosanol, and docosanol.

7. The admixture of claim 5 wherein said fatty alcohol is octadecanol.

8. The admixture of claim 1 wherein said fatty alcohol has a branched $C_{12}$–$C_{22}$ structure.

9. The admixture of claim 1 wherein, in said shrinkage reducing additive, AO represents ethylene oxide, propylene oxide, or a mixture thereof.

10. The admixture of claim 9 wherein AO represents propylene oxide.

11. The admixture of claim 9 wherein AO represents ethylene oxide.

12. The admixture of claim 1 wherein said shrinkage reducing additive has a molecular weight of up to 4000.

13. The admixture of claim 1 wherein said shrinkage reducing additive is present in the amount of 99.5–97.0% based on dry weight total solids of the admixture; and said at least one fatty alcohol is present in the amount of 0.5–3.0% based on dry weight total solids of the admixture.

14. The admixture of claim 1 further comprising a further admixture selected from the group consisting of water reducers, air entraining agents, air detraining agents, and set accelerators.

15. A cementitious composition comprising: a hydratable binder and the admixture of claim 1.

16. The cementitious composition of claim 15 wherein said hydratable binder is selected from the group consisting of Portland cement, masonry cement, mortar cement, gypsum, limestone, hydrated lime, fly ash, blast furnace slag, pozzolans, and silica fume.

17. The cementitious composition of claim 16 wherein said hydratable binder comprises both Portland cement and limestone.

18. The cementitious composition of claim 16 wherein said cementitious composition is mixed with water to provide a self-leveling mortar.

19. A method for minimizing dust on the surface of a structure formed from a cement, comprising: combining a cementitious binder, water, and the admixture of claim 1 to provide a hydratable cementitious composition, and allowing said hydratable cementitious composition to harden.

* * * * *